Feb. 18, 1969 G. E. HAMBLETON 3,428,911
RESONANT-LINE TRANSISTOR AMPLIFIER
Filed March 4, 1966
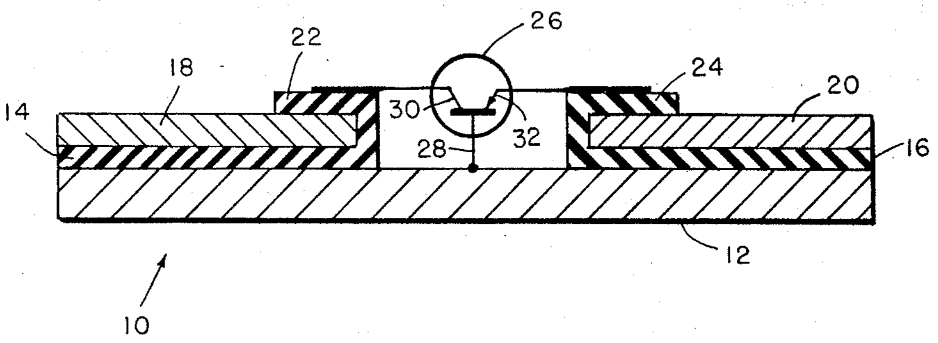
INVENTOR,
GEORGE E. HAMBLETON
BY Harry M. Saragovitz,
Edward J. Kelly, Herbert Berl
& Julian C. Keppler ATTORNEYS United States Patent Office 3,428,911
Patented Feb. 18, 1969

3,428,911
RESONANT-LINE TRANSISTOR AMPLIFIER

George E. Hambleton, Wall, N.J., assignor to the United States of America as represented by the Secretary of the Army Filed Mar. 4, 1966, Ser. No. 534,288
U.S. Cl. 330—31 2 Claims
Int. Cl. H03f *3/60;* H03h *7/38;* H01p *3/08*

ABSTRACT OF THE DISCLOSURE

A resonant-line amplifier including a microwave transistor and a strip transmission line having a common ground plane and two spaced center conductors insulated from the ground plane. The strip-line insulating material extends over and overlaps respective portions of the spaced center conductor strips. The emitter and collector electrodes of the microwave transistors are connected respectively to the overlapped portions to provide capacity coupling to the strip-line. For a given frequency, the α-phase shift through the transistor is electrically combined with the respective capacitance couplings to provide a half-wavelength resonator.

This invention relates to transistor amplifiers and more particularly to microwave transistor amplifiers.

In microwave communication systems it is desirable to utilize amplifier components which are very small in size and yet provide good low noise amplification, and are also capable of being produced with the same desirable characteristics.

It is an object of the present invention to provide a resonant-line transistor amplifier which is easy to construct, compact, and greatly reduced in size.

It is another object of the present invention to provide a resonant-line transistor amplifier wherein the input and output coupling capacitors form an integral part of the transmission line.

In accordance with the present invention there is provided a resonant-line amplifier which includes a transistor operative at microwave frequencies and characterized by a prescribed α - phase shift, and a strip transmission line. The strip transmission line includes a ground plane and two longitudinally spaced center conductors each separated from the ground plane by a suitable insulating material or dielectric. The respective insulating materials are extended over and made to overlap portions of the respective center conductors. The emitter and collector of the microwave transistor are respectively connected to the overlapped portion of the respective center conductors and the base of the transistor electrode is connected to the strip-line ground plane. At a prescribed frequency, the α-phase shift through the transistor combines with the coupling capacitance at the overlapped portions of the strip-line center conductor to make up a half-wavelength resonator. It has been found that the present invention is most effective for frequencies in the 1–4 gigacycle range.

For a better understanding of the invention, together with other and further objects thereof, reference is made to the single figure of the accompanying drawing which illustrates the invention.

Referring now to the drawing, at 10 there is shown a strip-line transmission line section having a ground plane

12, which may be of copper, applied as backing on one surface of respective spaced dielectrics or insulators 14 and 16. On the respective other surfaces of dielectrics or insulators 14 and 16 are longitudinally spaced strips of copper 18 and 20 which comprise center conductors of strip-line 10. As shown, the dielectric 14 is extended over and covers or overlaps a portion of the exposed surface of center conductor 18 as at 22 and, similarly, dielectric or insulator 16 is extended over and covers or overlaps a portion of the exposed surface of center conductor 20 as at 24. A microwave type transistor 26 is mounted such that its base electrode lead 28 is connected to ground plane 12, and its respective collector and emitter electrode leads 30 and 32 are respectively connected to those sections 22 and 24 of dielectrics 14 and 16 which cover or overlap the exposed surfaces of center conductors 14 and 16, respectively. One example of the type of microwave transistor to be used is known as type TIX 3016 manufactured by Texas Instruments Incorporated.

In effect, the overlapped section as at 22 and 24 comprise input and output coupling capacitors of preferably equal value. At a given frequency these capacitors will combine with the α-phase shift through the transistor 26 to make up a half-wavelength resonator. The power gain of transistor 26 appears only at the resonant frequency and at a concomitant relatively small bandwidth determined by the values of the coupling capacitors hereinabove described. These coupling capacitors will also serve as bias decoupling elements for the required D-C bias normally applied to collector 30 and emitter 32 in the conventional manner. Although the invention is described in connection with a microwave strip-line, it is not to be necessarily limited thereto. Other types of transmission lines, a coaxial line for example, may be utilized and operated in the same manner as the microwave strip-line shown in the drawing.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A resonant-line amplifier comprising
   a strip transmission line having a common ground plane and two spaced center conductors insulated from said ground plane,
   the insulating material extending over and overlapping respective portions of said spaced center conductor strips,
   a microwave transistor having a prescribed α-phase shift and including a base electrode, an emitter electrode and a collector electrode,
   said emitter electrode being connected to one of said overlapped portions, said collector electrode being connected to the other of said overlapped portions, and said base electrode being connected to said common ground plane.

2. The amplifier in accordance with claim 1 wherein the coupling capacitance formed between said emitter electrode and one of said center conductors, and the coupling capacitance formed between said collector electrode and the other of said center conductors, are in circuit with said α-phase shift through said transistor at a given frequency to provide an effective half-wavelength resonator.

References Cited

UNITED STATES PATENTS

| | | | |
|---|---|---|---|
| 3,133,207 | 5/1964 | Ayer | 333—84 |
| 3,155,881 | 11/1964 | St. Jean | 333—84 |

OTHER REFERENCES

"U.H.F.-TV Oscillator," Electronics World, p. 71, May 1964.

JOHN KOMINSKI, *Primary Examiner.*

U.S. Cl. X.R.

317—101; 330—56; 333—33, 84